(12) United States Patent
Eichel

(10) Patent No.: US 9,581,611 B2
(45) Date of Patent: Feb. 28, 2017

(54) SYSTEM AND METHOD FOR DETECTING A ROTATIONAL SPEED OF A TURBOCHARGER

(71) Applicant: Robert Bosch GmbH, Stuttgart (DE)

(72) Inventor: Dirk Eichel, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 210 days.

(21) Appl. No.: 14/371,152

(22) PCT Filed: Jan. 4, 2013

(86) PCT No.: PCT/EP2013/050105
§ 371 (c)(1),
(2) Date: Jul. 8, 2014

(87) PCT Pub. No.: WO2013/104567
PCT Pub. Date: Jul. 18, 2013

(65) Prior Publication Data
US 2015/0114096 A1 Apr. 30, 2015

(30) Foreign Application Priority Data
Jan. 10, 2012 (DE) .......................... 10 2012 200 261

(51) Int. Cl.
*G01M 15/02* (2006.01)
*G01P 3/44* (2006.01)
(Continued)

(52) U.S. Cl.
CPC ............... *G01P 3/44* (2013.01); *G01S 7/415* (2013.01); *G01S 13/02* (2013.01); *G01S 13/32* (2013.01); *G01S 13/88* (2013.01)

(58) Field of Classification Search
USPC .......................................... 73/114.25, 114.77
See application file for complete search history.

(56) References Cited

U.S. PATENT DOCUMENTS

2010/0011868 A1* 1/2010 Cox .......................... G01P 3/00
73/660
2010/0324799 A1* 12/2010 Davison .................... F02C 9/00
701/100

(Continued)

FOREIGN PATENT DOCUMENTS

| DE | 38 26 754 | 6/1998 |
| DE | 10 2010 003347 | 11/2010 |
| FR | 2 949 568 | 3/2011 |

OTHER PUBLICATIONS

International Search Report for PCT/EP2013/050105, dated Mar. 22, 2013.

*Primary Examiner* — Eric S McCall
(74) *Attorney, Agent, or Firm* — Gerard Messina

(57) ABSTRACT

A system for detecting a rotational speed of a turbocharger includes: a rotational speed sensor unit which includes a radar transmitter for emitting radar waves and a radar receiver for receiving the radar waves and which is designed to detect radar waves reflected by a machine element of the turbocharger and to provide them as a measuring signal; and an evaluation unit which is coupled to the rotational speed sensor unit and is designed to check whether the reflected radar waves are detectable by the radar receiver based on a predetermined criterion and to ascertain the rotational speed of the turbocharger based on an evaluation of the measuring signal.

10 Claims, 5 Drawing Sheets

(51) Int. Cl.
*G01S 7/41* (2006.01)
*G01S 13/32* (2006.01)
*G01S 13/88* (2006.01)
*G01S 13/02* (2006.01)

(56) References Cited

U.S. PATENT DOCUMENTS

| | | | | |
|---|---|---|---|---|
| 2010/0332180 A1* | 12/2010 | Seidel | ............... | G01P 3/48 |
| | | | | 702/145 |
| 2013/0342189 A1* | 12/2013 | Cox | ............... | F02C 6/12 |
| | | | | 324/166 |
| 2014/0007663 A1* | 1/2014 | Berger | ............... | G01M 15/09 |
| | | | | 73/112.05 |

* cited by examiner related art

SYSTEM AND METHOD FOR DETECTING A ROTATIONAL SPEED OF A TURBOCHARGER

BACKGROUND OF THE INVENTION

1. Field of the Invention

The present invention relates to a system and a method for detecting a rotational speed of a turbocharger.

2. Description of the Related Art

Published German patent application document DE 10 2010 003 347 A1 describes a method for determining information about a rotational speed of a compressor, in particular a turbocharger, including the steps of providing a measuring signal, in particular a microwave measuring signal, which is directed at a compressor impeller of the compressor, so that the measuring signal is reflected at rotating blades of the compressor impeller, and detecting the measuring signal reflected by one or multiple blades, and determining the information about the rotational speed of the turbocharger as a function of the reflected measuring signal.

Furthermore, a device for determining information about a rotational speed of a compressor, in particular a turbocharger, is described, the device having a signal source for providing a measuring signal, in particular a microwave measuring signal which is directed at a compressor impeller of the compressor so that the measuring signal is reflected at rotating blades of the compressor impeller, a sensor element for detecting the measuring signal reflected by one or multiple blades, and a control unit for determining the information about the rotational speed as a function of the reflected measuring signal.

FIG. 1A shows a cross-sectional representation through a turbocharger 101 known from published German patent application document DE 10 2010 003 347 A1, perpendicular to an axial direction of a shaft 102 which is rotatably supported in a turbocharger housing. FIG. 1B shows a cross-sectional view along the line S-S of FIG. 1A in the direction of the arrow of a turbocharger 101 known from published German patent application document DE 10 2010 003 347 A1.

Turbocharger 101 has a compressor impeller 103 including blades 104 and which is situated on shaft 102. Air is drawn in via an intake opening 105 in the axial direction of shaft 102 by rotation of compressor impeller 103 in turbocharger 101, compressed by blades 104 of compressor impeller 103, and discharged via an exhaust port 107 which is situated in a spiral configuration around compressor impeller 103. Compressor impeller 103 has a blade web 108 for each of blades 104 which supports a blade 109 which protrudes from blade web 108 in the axial direction and is also curved in the direction of the preferred direction of rotation of compressor impeller 103. A measuring device 110 is fixedly situated in the housing of turbocharger 101 which is suitable for the contact-free detection of the passing of an outer edge of blades 109. The location of the measuring device must be selected in such a way that measuring signals may be transmitted between measuring device 110 and the blade ends or blade tips virtually without interference. Measuring device 110 includes a signal source 111 for emitting a microwave measuring signal in the direction of blades 109. The measuring signal is provided in such a way that it may be reflected by one or multiple positions of the blade ends of blades 109. Furthermore, measuring device 110 includes a sensor element 112 in order to detect the microwave measuring signals reflected by the blade ends of blades 109. Sensor element 112 is correspondingly adapted to the type of the microwave measuring signal emitted by signal source 111. This means that if signal source 111 emits a radar signal as an electromagnetic signal, sensor element 112 corresponds to a radar wave sensor. Measuring device 110 is connected to a control unit 115. Control unit 115 receives a microwave signal representing the reflected microwave measuring signals from sensor element 112 and carries out an evaluation of the reflected microwave signal. Sensor element 112 provides a corresponding electrical variable such as a voltage signal or a current signal as an electrical measuring signal, the amplitude of which corresponds to an intensity of the reflected microwave signal. It may be provided to detect an excess rotational speed of compressor impeller 103 of turbocharger 101 and to store a corresponding item of information about it. If rotational speed n of compressor impeller 103 of turbocharger 101 exceeds a predefined rotational speed threshold value for a maximum rotational speed, this may be recorded, output, or stored in a memory unit 116 for later retrieval in a suitable manner.

Well known and available systems for rotational speed detection for turbochargers based on inductive systems are fixedly installed on the particular turbocharger housing of the vehicle. Rotational speed sensors based on such systems are unsuitable for use in mobile and type-independent garage diagnostic devices, since these rotational speed sensors form a unit together with the turbocharger, i.e., in the case of an inductive sensor, the sensor is closely adapted to the specific turbocharger type, and tapping the signal for signal evaluation is impossible.

BRIEF SUMMARY OF THE INVENTION

The present invention provides a system for detecting a rotational speed of a turbocharger including a rotational speed sensor unit which includes a radar transmitter for emitting radar waves and a radar receiver for receiving the radar waves and which is designed to detect radar waves reflected by a machine element of the turbocharger and to provide them as a measuring signal, and including an evaluation unit which is coupled to the rotational speed sensor unit and is designed to check whether the reflected radar waves are detectable by the radar receiver based on a predetermined criterion and to ascertain the rotational speed of the turbocharger based on an evaluation of the measuring signal.

In addition, the present invention provides a method for detecting a rotational speed of a turbocharger including the steps of emitting radar waves via a radar transmitter of a rotational speed sensor unit and receiving the radar waves which are reflected by a machine element of the turbocharger via a radar receiver of the rotational speed sensor unit, the received radar waves being provided as a measuring signal, and checking whether the reflected radar waves are detected by the radar receiver based on a predetermined criterion, and ascertaining the rotational speed of the turbocharger via an evaluation unit based on an evaluation of the measuring signal.

The idea of the present invention is that, depending on the illumination angle of the radar sensor with respect to the turbocharger, signal cancellations may occur in the reception signal of the radar sensor, and that the user is supported when attaching the radar sensor to the turbocharger in order to avoid erroneous measurements.

One additional advantage of the present invention is that the radar sensor may be attached to the turbocharger independently of the particular vehicle or engine and may be removed again after a measurement is made. Connected plastic hoses do not pose an obstacle for the radar waves.

According to one specific embodiment of the present invention, the detection of the rotational speed of the turbocharger is achieved by the predetermined criterion including a degree of a formation of a periodicity of the measuring signal. This allows an exact detection of the rotational speed of the turbocharger, a short time span in the range of one period of revolution of the machine element being required for measuring the rotational speed.

According to another specific embodiment of the present invention, the degree of the formation of the periodicity of the measuring signal may be determined by the evaluation unit with the aid of a spectrum analysis and/or a counting of zero crossings of the measuring signal and/or a Fourier transform of the measuring signal. This type of evaluation method allows a reduction of the required computing power of the evaluation unit. Furthermore, an additional acceleration of the detection of the rotational speed is made possible in an advantageous manner.

According to another specific embodiment of the present invention, the evaluation unit is designed to carry out the evaluation of the measuring signal for at least as many periods as the turbocharger has machine elements. As a result, parasitic noise in the measuring signal is advantageously filtered and the reliability of the system increases.

According to another specific embodiment of the present invention, the machine element is designed as a compressor blade.

According to another specific embodiment of the present invention, the system is designed as a vehicle diagnostic system.

According to another specific embodiment of the present invention, the system is focused on the turbocharger at a distance of 1 cm to 300 cm, preferably 1 cm to 30 cm. This enables flexible positioning of the system and allows convenient handling for the user when using the system as a garage diagnostic device.

According to another specific embodiment of the present invention, the radar transmitter and the radar receiver are designed for transmitting and receiving within a frequency range from 300 MHz to 300 GHz, in particular from 500 MHz to 200 GHz, particularly preferably between 2200 MHz and 12 GHz.

According to another specific embodiment of the present invention, the system has a display unit which is coupled to the evaluation unit and which is designed to display a result of the check of the position of the rotational speed sensor unit and the ascertained rotational speed of the turbocharger. This specific embodiment has the advantage that a visual indication of variable information with respect to the result of the check is achieved in a simple manner.

According to one specific embodiment of the method, a degree of a formation of a periodicity of the measuring signal is detected as the predetermined criterion. As a result, the signal quality may be reliably determined.

According to one specific embodiment of the method, the degree of the formation of the periodicity of the measuring signal is determined by the evaluation unit with the aid of a spectrum analysis and/or a Fourier transform of the measuring signal. This allows an advantageous analysis of the oscillation sampled using the measuring signal for ascertaining the amplitude spectrum, including all its frequency values which physically play a role and are directly related to the rotational speed of the turbocharger.

Additional features and advantages of specific embodiments of the present invention result from the following description with reference to the appended drawings.

DETAILED DESCRIPTION OF THE INVENTION

Figure 1:
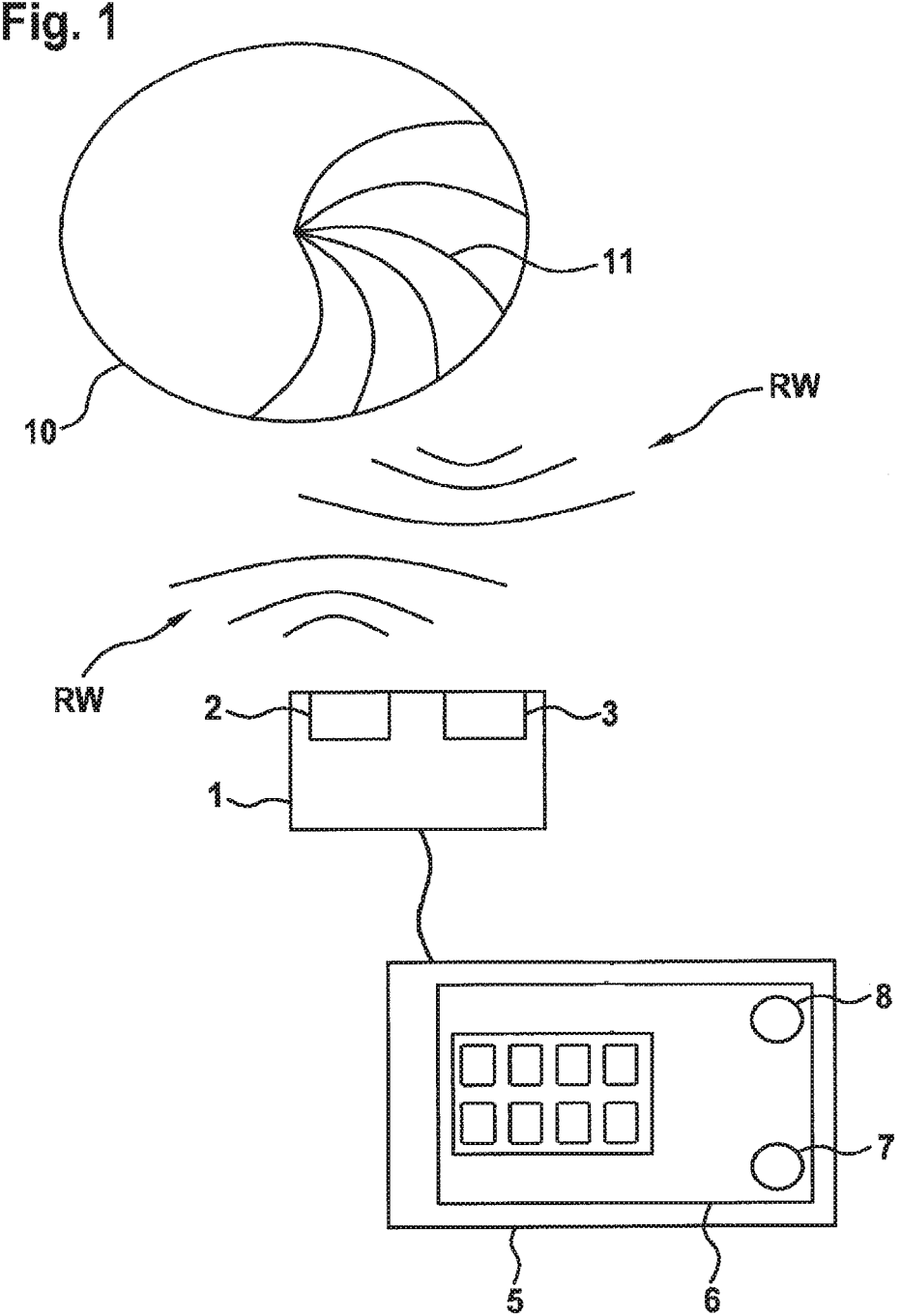
FIG. 1 shows a schematic representation of one specific embodiment of a system according to the present invention for detecting a rotational speed of a turbocharger.

In the figures of the drawings, identical and functionally identical elements, features, and components are provided with the same reference numerals unless otherwise stated. Furthermore, for reasons of clarity and comprehensibility, components and elements in the drawings are not necessarily shown true to scale relative to one another.

FIG. 1 shows schematic representations a schematic representation of one specific embodiment of a system according to the present invention for detecting a rotational speed of a turbocharger. The system includes a rotational speed sensor unit 1 and an evaluation unit 5 which has a display unit 6.

Evaluation unit 5 is, for example, designed as a programmable logic controller or as a programmable digital computer. Display unit 6 is, for example, designed as a device for the visual indication of variable information, states, and values, in particular, of measured rotational speed values. Rotational speed sensor unit 1 is connected to the evaluation unit and includes a radar transmitter 2 for emitting radar waves RW and a radar receiver 3 for receiving the emitted radar waves RW which are reflected back by a machine element 11 of turbocharger 10 and detected by radar receiver 3.

Rotational speed sensor unit 1 forms a measuring signal from the received radar waves RW which is transmitted to evaluation unit 5.

Radar transmitter 2 is, for example, designed as a continuous-wave radar and uses an unmodulated transmission signal, a high-performance amplifier, a traveling-wave tube, or another semiconductor transmitter module being used for signal amplification.

Radar receiver 3 is, for example, designed having an integrated antenna and uses point-contact diodes screwed into waveguides, in which stripline semiconductor circuits may be used.

In the illustrated embodiment variant, display unit 6 is integrated into evaluation unit 5. For example, display unit 6 may also be designed to be separate from evaluation unit 5 and connected to evaluation unit 5 via a cable or a wireless communication link.

Evaluation unit 5 has information with respect to the number of machine elements 11 installed on a shaft of turbocharger 10 via manual input or via automatic readout of an identifier of turbocharger 10 or the vehicle.

Display elements 7 and 8 make it possible to display the state indicating whether the reflected radar waves RW are detectable by radar receiver 3 and to inform a user, for example, of a requirement to change the position of rotational speed sensor unit 1 for the optimal detection of the rotational speed of turbocharger 10. Furthermore, display unit 6 has, for example, an alphanumeric display for displaying the calculated rotational speed value of turbocharger 10.

Alternatively to the embodiment of the system including radar transmitter 2 for emitting radar waves RW and radar receiver 3 for receiving radar waves RW, the system may include transceiver units for transmitting and receiving electromagnetic waves or radiation in other electromagnetic spectral ranges, for example, terahertz radiation in the range from 100 GHz to 300 GHz; for example, microwaves in the range from 300 MHz to 100 GHz; or, for example, radio waves in the range from 30 kHz to 300 MHz.

Alternatively to the manual input or a readout of an identifier or type designation of the turbocharger or the vehicle, evaluation unit 5 may also detect a periodic harmonic in the measuring signal provided by the rotational speed sensor unit and, based on this harmonic, itself determine the number of impellers or machine elements 11 of turbocharger 10. This harmonic in the measuring signal is caused by a small, unavoidable imbalance of turbocharger 10 and enables the direct determination of the rotational speed of turbocharger 10.

Figure 2A:
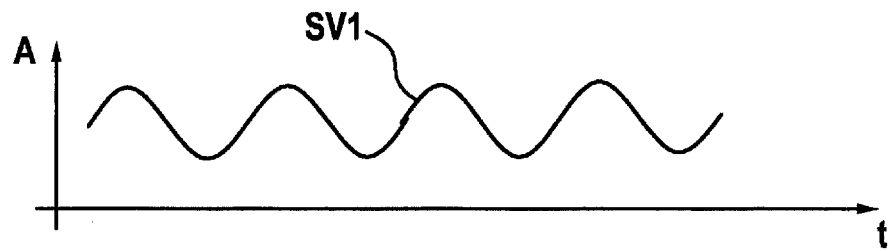
FIGS. 2A through 2C show amplitude-time diagrams of possible signal profiles over time of measuring signals detected by the rotational speed sensor unit according to one specific embodiment of a system according to the present invention for detecting a rotational speed of a turbocharger.
Figure 2B:
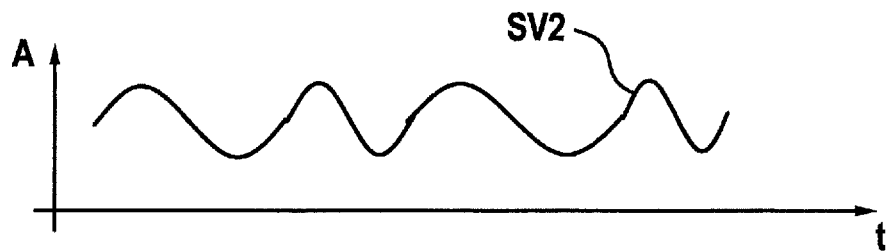
Figure 2C:
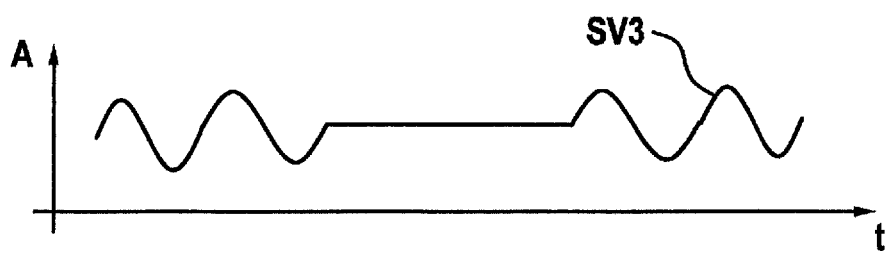

FIGS. 2A through 2C each show an amplitude-time diagram, each having different signal profiles SV1 through SV3 over time of measuring signals which are detected by rotational speed sensor unit 1. Time is plotted on the X-axis of the diagrams. Signal amplitude A is plotted on the Y-axis of the diagrams, for example, a voltage is used as a physical variable which is to be detected by sensor unit 1 and plotted in the diagram. The depicted signal profiles SV1 through SV3 have, for example, a dominant sinusoidal shape.

FIG. 2A shows an amplitude-time diagram of a signal profile SV1 of a measuring signal in which a high degree of a periodicity is formed. The degree of the periodicity is used, for example, as the predetermined criterion and is ascertained by evaluation unit 5 and used for determining the rotational speed of turbocharger 10. In signal profile SV1 shown in FIG. 2A, since all of the reflection pulses or radar waves RW emanating from individual machine elements 11 are detectable, the values of the measuring signal repeat at regular intervals, and a specific frequency corresponding to the rotational speed of turbocharger 10 is therefore dominant in the frequency spectrum of the measuring signal. For example, depicted signal profile SV1 is particularly advantageous for determining the rotational speed of turbocharger 10.

FIG. 2B shows an amplitude-time diagram of a signal profile SV2 of a measuring signal, in which a lower degree of a periodicity of the measuring signal is formed in comparison to signal profile SV1 of FIG. 2A. In depicted signal profile SV2 of the measuring signal, the values of the measuring signal also repeat at predominantly regular intervals. However, the absence of certain reflections from individual machine elements 11 of turbocharger 10 results in a disadvantageous alteration of the measuring signal and detected signal profile SV2. For example, a disadvantageous geometrical arrangement of rotational speed sensor unit 1 with respect to machine elements 11 of turbocharger 10 is the cause for the lack of detection of all reflections by radar receiver 3.

Signal profile SV3 over time of the measuring signal shown in the amplitude-time diagram in FIG. 2C has an additional degradation of the measuring signal in comparison to signal profiles SV1 and SV2. For example, based on such a measuring signal, a detection of the rotational speed of turbocharger 10 by evaluation unit 5 is possible only with difficulty or is no longer possible at all without moving radar receiver 3 of rotational speed sensor unit 1 into a more suitable spatial position for detecting the reflections of machine elements 11.

Figure 3A:
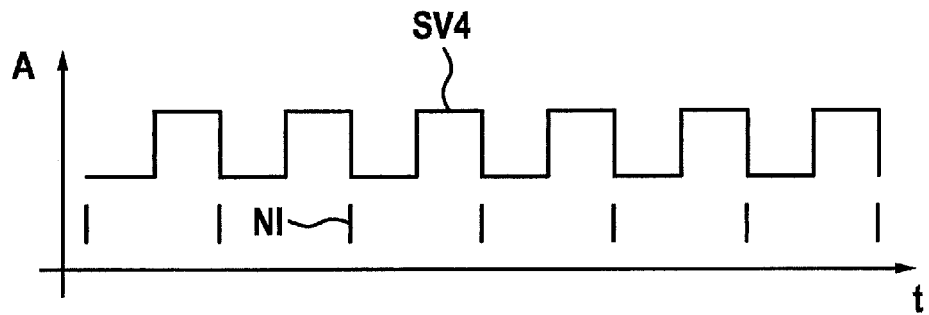
FIGS. 3A through 3C show amplitude-time diagrams of additional possible signal profiles over time of measuring signals detected by the rotational speed sensor unit and associated pulse diagrams according to one specific embodiment of a system according to the present invention for detecting a rotational speed of a turbocharger.
Figure 3B:
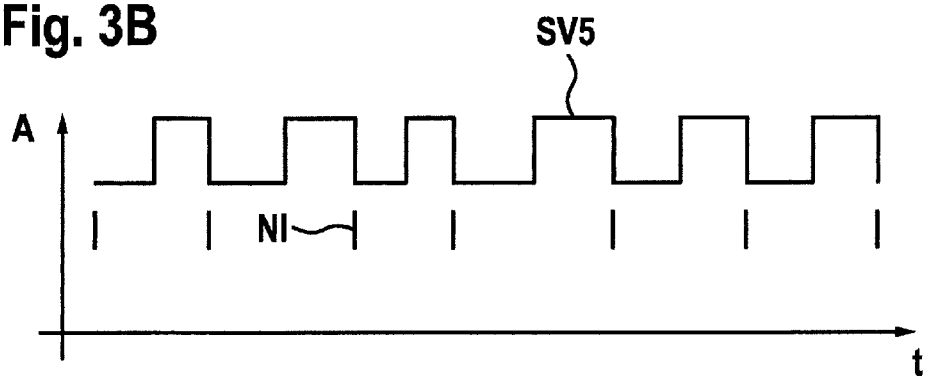
Figure 3C:
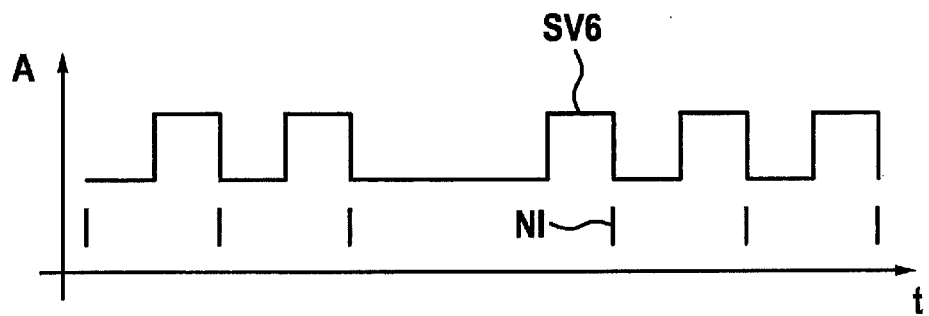

FIGS. 3A through 3C show amplitude-time diagrams of additional signal profiles SV4 through SV6 over time of measuring signals detected by rotational speed sensor unit 1. Furthermore, FIGS. 3A through 3C show pulse diagrams which have spike pulses NI which are ascertained based on an analysis of a periodicity of the measuring signal. Time is plotted on the X-axis. The signal amplitude of the measuring signal is plotted on the Y-axis.

The evaluation of the measuring signal allows the evaluation of the characteristics and those frequencies in the amplitude spectrum of each signal profile. Those frequencies which are directly related to the rotational speed of turbocharger 10 due to the detected radar reflections of machine elements 11 are used to determine the rotational speed of turbocharger 10.

FIGS. 3A through 3C each show spike pulses NI in a pulse diagram below each of the depicted signal profiles SV4 through SV6 in the amplitude-time diagram. Spike pulses NI are ascertained by an evaluation of each signal profile SV4 through S6 which is carried out by evaluation unit 5 and represent a radar reflection of a single machine element 11 of turbocharger 10 which is detected using the measuring signal. For example, spike pulses NI are derived by evaluation unit 5 from a demodulated time signal of each of signal profiles SV4 through S6.

Spike pulses NI are plotted as vertical lines above the X-axis at each point in time at which each radar reflection of machine element 11 is detected by radar receiver 3.

FIG. 3A shows a signal profile SV4 in the amplitude-time diagram having a high degree of periodicity of the measuring signal. FIG. 3B shows a signal profile SV5 having a lower degree of periodicity of the measuring signal in comparison to signal profile SV4 of FIG. 3A. Signal profile SV6 of the measuring signal shown in FIG. 3C has an additional degradation of the measuring signal in comparison to signal profiles SV4 and SV5.

Figure 4:
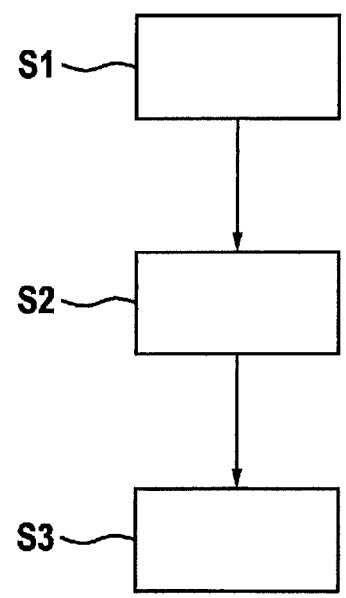
FIG. 4 shows a graphical representation of a flow chart of a method for detecting a rotational speed of a turbocharger.
Figure 5A:
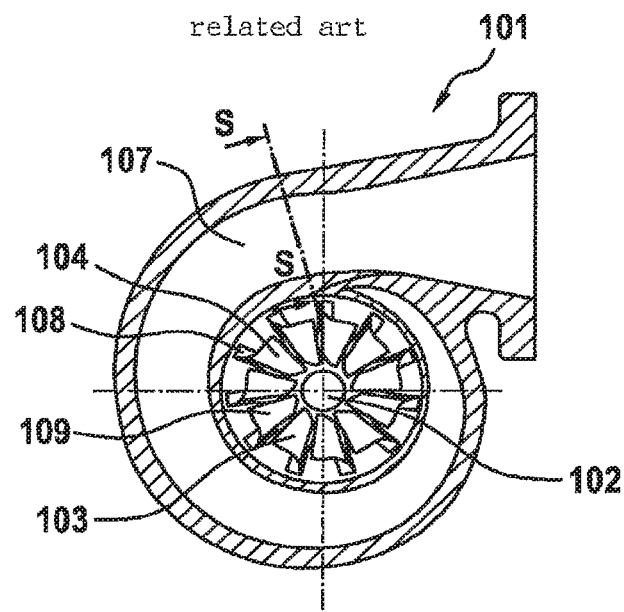
FIGS. 5A and 5B show sectional views through a turbocharger known from published German patent application document DE 10 2010 003 347 A1 in the axial direction and along the line of intersection S-S.
Figure 5B:
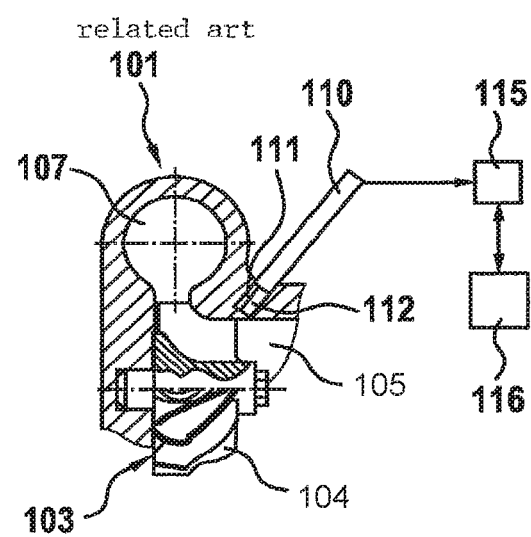

The method according to the present invention for detecting a rotational speed of a turbocharger is explained below based on FIG. 4.

In a first step S1, the rotational speed of turbocharger 10 is detected by rotational speed sensor unit 1 as a sensor signal and converted into an electrical measuring signal. For this purpose, radar waves RW are emitted by a radar transmitter 2 of rotational speed sensor unit 1, and radar waves RW which are reflected by a machine element 11 of turbocharger 10 are received again by a radar receiver 3 of rotational speed sensor unit 1, the received radar waves RW being provided as a measuring signal.

In a second step S2, a check S2 is carried out based on a predetermined criterion of whether reflected radar waves RW are detected by radar receiver 3, and furthermore, an ascertainment is made of the rotational speed of turbocharger 10 by an evaluation unit 5 based on an evaluation of the measuring signal.

If the period of the remaining oscillations is of the same order of magnitude, for example, if the period is less than 1.5 times the reference period, the rotational speed sensor unit 1 is attached in such a way that reliable measurements of the system are possible.

If the observation interval is increased, the possibility also exists of correcting brief signal dropouts, for example, less than 10% of the observation interval, via signal processing by the evaluation unit. The signal received by the rotational speed sensor unit is detected by an evaluation unit for at least as many signal periods as the compressor impeller of the turbocharger has compressor blades. The duration of the shortest period or reference period is ascertained. The other periods are compared to it.

In a third step S3, the rotational speed values determined by evaluation unit 5 are displayed by a display unit 6 which is coupled to evaluation unit 5 or is integrated into evaluation unit 5. Furthermore, alternatively or in addition, a result of the check of the suitability of the position of rotational speed sensor unit 1 with respect to an optimal detection of the rotational speed of turbocharger 10 is displayed.

The result of the check of the position of rotational speed sensor unit 1 is displayed to the user on display unit 6 by display elements 7 and/or 8 which, for example, are configured in the form of indicator lamps which use an incandescent bulb or a light-emitting diode or a signal light-emitting diode as an illuminant. If the rotational speed sensor unit is incorrectly positioned, no rotational speed information is output.

What is claimed is:

1. A system for detecting a rotational speed of a turbocharger, comprising:
    a rotational speed sensor unit which includes (i) a radar transmitter emitting radar waves, and (ii) a radar receiver receiving the radar waves, wherein the rotational speed sensor unit is configured to detect radar waves reflected by at least one machine element of the turbocharger and provide the detected radar waves as a measuring signal; and
    an evaluation unit coupled to the rotational speed sensor unit and configured to: check, based on a predetermined criterion, whether the reflected radar waves are detectable by the radar receiver; and ascertain the rotational speed of the turbocharger based on an evaluation of the measuring signal;
    wherein the predetermined criterion includes a degree of a formation of a periodicity of the measuring signal.

2. The system as recited in claim 1, wherein the degree of the formation of the periodicity of the measuring signal is determined by the evaluation unit with the aid of at least one of a spectrum analysis and a Fourier transform of the measuring signal.

3. The system as recited in claim 1, wherein the evaluation unit carries out the evaluation of the measuring signal for at least as many periods as the number of machine elements included in the turbocharger.

4. The system as recited in claim 3, wherein the machine elements are compressor blades.

5. The system as recited in claim 4, wherein the system is configured as a vehicle diagnostic system.

6. The system as recited in claim 4, wherein the rotational speed sensor unit is focused on the turbocharger at a distance of 1 cm to 30 cm.

7. The system as recited in claim 4, wherein the radar transmitter and the radar receiver are configured to transmit and receive within a frequency range from 2200 MHz to 12 GHz.

8. The system as recited in claim 4, further comprising:
    a display unit coupled to the evaluation unit and configured to display (i) a result of a check of the position of the rotational speed sensor unit and (ii) the ascertained rotational speed of the turbocharger.

9. A method for detecting a rotational speed of a turbocharger, comprising:
    emitting radar waves by a radar transmitter of a rotational speed sensor unit;
    receiving, by a radar receiver of the rotational speed sensor unit, the radar waves which are reflected by a machine element of the turbocharger;
    providing the received radar waves as a measuring signal;
    checking, based on a predetermined criterion, whether the reflected radar waves are detected by the radar receiver; and
    ascertaining, by an evaluation unit, the rotational speed of the turbocharger based on an evaluation of the measuring signal;
    wherein a degree of a formation of a periodicity of the measuring signal is utilized as the predetermined criterion.

10. The method as recited in claim 9, wherein the degree of the formation of the periodicity of the measuring signal is determined by the evaluation unit with the aid of at least one of a spectrum analysis, a Fourier transform of the measuring signal, and counting of zero crossings of the measuring signal.

* * * * *